US007519114B2

(12) United States Patent
Kim

(10) Patent No.: US 7,519,114 B2
(45) Date of Patent: Apr. 14, 2009

(54) GOF/GOP TEXTURE DESCRIPTION METHOD, AND TEXTURE-BASED GOF/GOP RETRIEVAL METHOD AND APPARATUS USING THE SAME

(75) Inventor: Sang-kyun Kim, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 958 days.

(21) Appl. No.: 10/892,463

(22) Filed: Jul. 16, 2004

(65) Prior Publication Data

US 2005/0058195 A1 Mar. 17, 2005

Related U.S. Application Data

(60) Provisional application No. 60/487,945, filed on Jul. 18, 2003.

(30) Foreign Application Priority Data

Jul. 14, 2004 (KR) .................... 10-2004-0054719

(51) Int. Cl.
  *H04N 7/12* (2006.01)
  *H04N 7/18* (2006.01)
(52) U.S. Cl. ............. 375/240.01; 382/181; 375/240.08
(58) Field of Classification Search ................ 348/352, 348/700, 699, 416, 407; 382/220, 216, 219, 382/236, 238, 181, 191, 276, 305, 190, 203; 375/240.01, 240.12, 240.16, 240.08, 240.17
See application file for complete search history.

(56) References Cited

U.S. PATENT DOCUMENTS

| 5,956,829 | A | 9/1999 | Kitahara et al. |
| 6,192,150 | B1 * | 2/2001 | Leow et al. ................ 382/190 |
| 6,198,203 | B1 | 3/2001 | Hotomi |

(Continued)

FOREIGN PATENT DOCUMENTS

| EP | 0 782 923 A1 | 7/1997 |
| EP | 1 067 609 A1 | 1/2001 |
| KR | 2003-0029410 A | 4/2003 |

OTHER PUBLICATIONS

European Search Report issued in corresponding European Application No. EP 04 25 4309 on Feb. 1, 2007, EPO, Berlin, Germany (in English).

(Continued)

*Primary Examiner*—Behrooz Senfi
(74) *Attorney, Agent, or Firm*—Buchanan Ingersoll & Rooney PC

(57) ABSTRACT

A method of describing texture of a group of frames (GoF) or a group of pictures (GoP) using homogeneous texture descriptors, and a method and apparatus for retrieving a GoF/GoP using the texture description method are provided. The texture description method includes: generating homogeneous texture descriptors of all frames constituting the GoF or all pictures constituting the GoF; and expressing the GoF or GoP using a predetermined representative homogeneous texture descriptor corresponding to one frame or picture to reduce the amount of data. The GoF/GoP retrieval method includes: establishing a database of homogeneous texture descriptors of a plurality of GoFs' or GoPs', each GoF or GoP being expressed by a predetermined representative homogeneous texture descriptor corresponding to one frame or picture to reduce the amount of data; generating a homogeneous texture descriptor corresponding to one frame or picture of a query GoF or GoP when the query GoF or GoP is input; searching homogeneous texture descriptors that are similar to the homogeneous texture descriptor of the query GoF or GoP in the database; and retrieving GoFs' or GoPs' corresponding to the searched similar homogeneous texture descriptors and arranging GoFs' or GoPs' in the order of degree of similarity. Therefore, the texture of images can be more accurately expressed, and an image can be more efficiently and rapidly retrieved.

12 Claims, 4 Drawing Sheets

U.S. PATENT DOCUMENTS

| | | | |
|---|---|---|---|
| 6,265,139 B1 | 7/2001 | Yun et al. | |
| 6,650,705 B1* | 11/2003 | Vetro et al. | 375/240.08 |
| 6,674,905 B1* | 1/2004 | Matsugu et al. | 382/199 |
| 6,728,314 B2* | 4/2004 | Kan et al. | 375/240.12 |
| 6,850,644 B1* | 2/2005 | Shin et al. | 382/190 |
| 6,957,387 B2* | 10/2005 | Barbieri | 715/719 |
| 7,010,036 B1* | 3/2006 | Mory | 375/240.08 |
| 7,143,434 B1* | 11/2006 | Paek et al. | 725/142 |
| 7,313,248 B2* | 12/2007 | Tonisson | 382/100 |
| 2003/0020743 A1* | 1/2003 | Barbieri | 345/719 |
| 2006/0129909 A1* | 6/2006 | Butt et al. | 715/500.1 |

OTHER PUBLICATIONS

Medasani, Swarup, et al., "*Categorization of Image Databases for Efficient Retrieval Using Robust Mixture Decomposition*", Content-Based Access of Image and Video Libraries, 1998. Proceedings. IEEE Workshop in Santa Barbara, CA, USA Jun. 21, 1998, pp. 50-54, IEEE Comput. Soc., Los Alamitos, CA, USA.

Yong Man, Ro, et al., "*MPEG-7 Homogeneous Texture Descriptor*", ETRI Journal, vol. 23, No. 2, Jun. 2001, pp. 41-51, Electron & Telecommun. Res. Inst., Taejon, South Korea.

De Bonet, Jeremy S., et al., "*Structure Driven Image Database Retrieval*", Proceedings of the 1997 Conference on Advances in Neural Information Processing Systems 10, [Online] 1998, pp. 866-872, URL: http://research.microsoft.com/{viola/Pubs/MIT/debonetNips97_IDB.pdf#search=%22image%20retrieval%20texture%20multiple-queries%200R%20sample-queries%200R%20similar-queries%20features%200R%20descriptors%20average%200R%20mean%200R%20median%200R%20smallest%22> {retrieved on Oct. 11, 2006].

Sikora, Thomas, "*The MPEG-7 Visual Standard for Content Description—An Overview*", IEEE Transactions on Circuits and Systems for Video Technology, Jun. 2001, pp. 696-702, vol. 11, No. 6, IEEE Service Center, Piscataway, NJ, USA.

Ferman, A. Mufit, et al., "*Group-of-Frames/Pictures Color Histogram Descriptors for Multimedia Applicatiosn*", Image Processing, 2000. Proceedings. 2000 International Conference, Sep. 10-13, 2000, pp. 65-68, vol. 1, IEEE, Piscataway, NJ, USA.

Le Saux, Bertrand, et al., "*Unsupervised Robust Clustering for Image Database Categorization*", Pattern Recognition, 2002. Proceedings. 16th International Conference in Quebec City, Que., Canada, Aug. 11-15, 2002, pp. 259-262, vol. 1, IEEE Comput. Soc., Los Alamitos, CA, USA.

Office Action issued by Korea Patent Office on Feb. 28, 2006.

European Search Report.

* cited by examiner

GOF/GOP TEXTURE DESCRIPTION METHOD, AND TEXTURE-BASED GOF/GOP RETRIEVAL METHOD AND APPARATUS USING THE SAME

This application claims the benefit of U.S. Provisional Patent Application No. 60/487,945, filed on Jul. 18, 2003, in the U.S. Patent and Trademark Office, and Korean Patent Application No. 2004-54719, filed on Jul. 14, 2004, in the Korean Intellectual Property Office, the disclosures of which are incorporated herein in their entirety by reference.

BACKGROUND OF THE INVENTION

1. Field of the Invention

The present invention relates to image processing, and more particularly, to a GoF/GoP (Group of Frames/Group of Pictures) texture description method and a texture-based GoF/GoP retrieval method and apparatus using the same.

2. Description of the Related Art

Texture information of images as an indicator of important visual features of images has been studied for a long time. This texture information of images is used as a major low level descriptor for indexing and summarizing image or video data on a contents basis. The texture information of images is useful for retrieving a particular photograph from electronic albums or for retrieving data based on contents from tile or textile databases.

However, in order to retrieve a GoF corresponding to a video sequence or a GoP corresponding to a group of pictures in an images database, all descriptors of individual frames constituting the GoF or individual pictures constituting the GoP have to be used as queries. For example, with the assumption that there is a GoF consisting of 100 frames, in order to retrieve the GoF from an images database, the images database is searched using all descriptors of individual frames constituting the GoF as queries. Therefore, the data of the queries becomes too large, and it takes much time to retrieve data from the database using the queries.

SUMMARY OF THE INVENTION

The present invention provides a method of describing texture of a group of frames (GoF) or a group of pictures (GoP) using homogeneous texture descriptors.

The present invention provides a method and apparatus for retrieving a GoF/GoP from an images database using the homogeneous texture descriptor-based GoF/GoP texture description method.

According to an aspect of the present invention, there is provided a method of describing texture of a GoF or GoP, the method comprising: generating homogeneous texture descriptors of all frames constituting the GoF or all pictures constituting the GoF; and expressing the GoF or GoP using a predetermined representative homogeneous texture descriptor corresponding to one frame or picture to reduce the amount of data.

Components of each of the homogeneous texture descriptors may include the mean and the variance of energies of frequency domains of a Garbor-filtered image, the energy of a DC channel, and the variance of all pixel values of the image.

The predetermined representative homogeneous texture descriptor in the expressing the GoF or GoP may include the average of the values of each of the components of the homogeneous texture descriptors for all the frames or pictures, the median among the values of each of the components of the homogeneous texture descriptors for all the frames or pictures, or the smallest among the values of each of the components of the homogeneous texture descriptors for all the frames or pictures.

According to another aspect of the present invention, there is provided a method of retrieving a GoF or GoP that is similar to a query GoF or GoP, the method comprising: establishing a database of homogeneous texture descriptors of a plurality of GoFs's or GoPs's, each GoF or GoP being expressed by a predetermined representative homogeneous texture descriptor corresponding to one frame or picture to reduce the amount of data; generating a homogeneous texture descriptor corresponding to one frame or picture of a query GoF or GoP when the query GoF or GoP is input; searching homogeneous texture descriptors that are similar to the homogeneous texture descriptor of the query GoF or GoP in the database; and retrieving GoFs's or GoPs's corresponding to the searched similar homogeneous texture descriptors and arranging GoFs's or GoPs's in the order of degree of similarity.

The predetermined representative homogeneous texture descriptor in the establishing the database may include the average of the values of each of the components of the homogeneous texture descriptors for all the frames or pictures, the median among the values of each of the components of the homogeneous texture descriptors for all the frames or pictures, or the smallest among the values of each of the components of the homogeneous texture descriptors for all the frames or pictures.

According to another aspect of the present invention, there is provided an apparatus for retrieving a GoF or GoP that is similar to a query GoF or GoP, the apparatus comprising: a homogeneous texture descriptor database storing homogeneous texture descriptors of a plurality of GoFs's or GoPs's, each GoF or GoP being expressed by a predetermined representative homogeneous texture descriptor corresponding to one frame or picture to reduce the amount of data; a query homogeneous texture descriptor generating unit generating a predetermined homogeneous texture descriptor of a query GoF or GoP when the query GoF or GoP is input; a homogeneous texture descriptor search unit searching the database for homogeneous texture descriptors that are similar to the predetermined homogeneous texture descriptor of the query GoF or GoP; and a GoF/GoP retrieving unit retrieving GoFs's or GoPs's corresponding to the searched similar homogeneous texture descriptors and arranging the GoFs's or GoPs's in the order of degree of similarity.

According to another aspect of the present invention, there is provided a computer readable medium having embodied thereon a computer program for any one of the above-described methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A GoF/GoP texture description method using homogeneous texture descriptors (HTDs) and a GoF/GoP retrieval method and apparatus using the texture description method according to the present invention will be described in detail with reference to the appended drawings.

Figure 1:
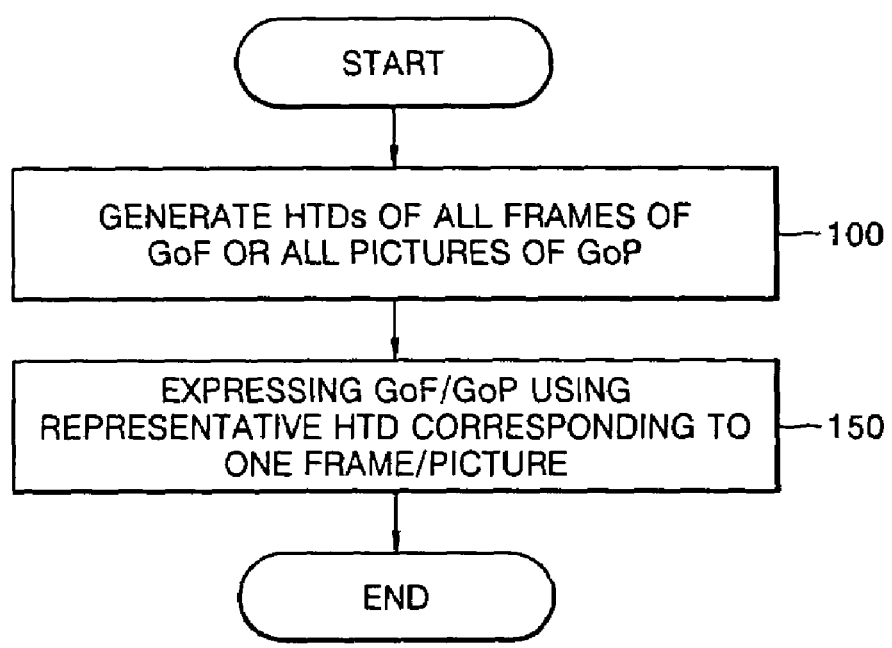
FIG. 1 is a flowchart illustrating a GoF/GoP texture description method according to the present invention.

Referring to FIG. 1, which is a flowchart of a GoF/GoP texture description method according to the present invention, when an arbitrary GoF or GoP is input, homogeneous texture descriptors (HTDs) of all frames constituting the GoF or of all pictures constituting the GoP are generated (operation 100). For example, if the input GoF consists of 100 frames, 100 HTDs are generated for the GoF.

An example of generating HTDs now will be described. When an arbitrary image is input, the input image is transformed to a frequency domain of an orthogonal coordinate system or a polar coordinate system by Fourier transformation. One-dimensional Fourier transformation following Radon transformation leads to transformation to the frequency domain of the polar coordinate system. The Radon transformation refers to a series of processes of obtaining 1-dimensional projection data by linearly integrating 2-dimensional images or multi-dimensional multimedia data at angles. In other words, the Radon transformation is based on the principle that an object appears differently depending on viewing angles and the contour of the object can be estimated when viewed at every angle.

The image transformed to the frequency domain of the polar coordinate system is filtered in a predetermined sub-frequency domain using a Garbor filter. The Garbor filter may consist of 5×6 filter regions, 5 in a radial direction and 6 at angles.

Next, in the frequency domain of the orthogonal coordinate system or the polar coordinate system, texture features of the Garbor-filtered image are extracted. Here, the frequency domain of the orthogonal coordinate system or the polar coordinate system can be divided into sub-frequency domains, which are referred to as feature channels, based on the human visual perception system.

The texture features of the image include the mean and the variance of energies of the sub-frequency domains of the Garbor-filtered image, the energy of a DC channel, and the variance of all pixel values of the image.

A HTD can be expressed by formula (1) below using the mean and the variance of energies for each frequency domain, i.e., each channel.

$$F = [f_{STD}, f_{DC}, e(1), \ldots, e(30), d(1), \ldots, d(30)] \quad (1)$$

wherein $f_{STD}$ represents the variance of all pixel values of the image, $f_{DC}$ represents the energy of a DC channel, $e(i)$, where $i=1, \text{CDOTS}, 30$, represents the mean of energies of each Garbor-filtered channel, and $d(i)$, where $i=1, \text{CDOTS}, 30$, represents the variance of energies of each Garbor-filtered channel.

In an embodiment according to the present invention, a HTD for each frame or picture, which is expressed as formula (1) above, consists of 62 values in Table 1 below.

| Homogeneous Texture |
|---|
| HT[0]-Average |
| HT[1]-STD |
| HT[2]-Energy 1 |
| HT[3]-Energy 2 |
| HT[4]-Energy 3 |
| . |
| . |
| . |
| HT[60]-Energy STD 29 |
| HT[61]-Energy STD 30 |

Once the HTDs for all frames constituting the GoF or all pictures constituting the GoP have been obtained, the GoF or GoP is expressed using a predetermined representative HTD corresponding to one frame or picture to reduce the amount of data (operation 150).

Figure 2:
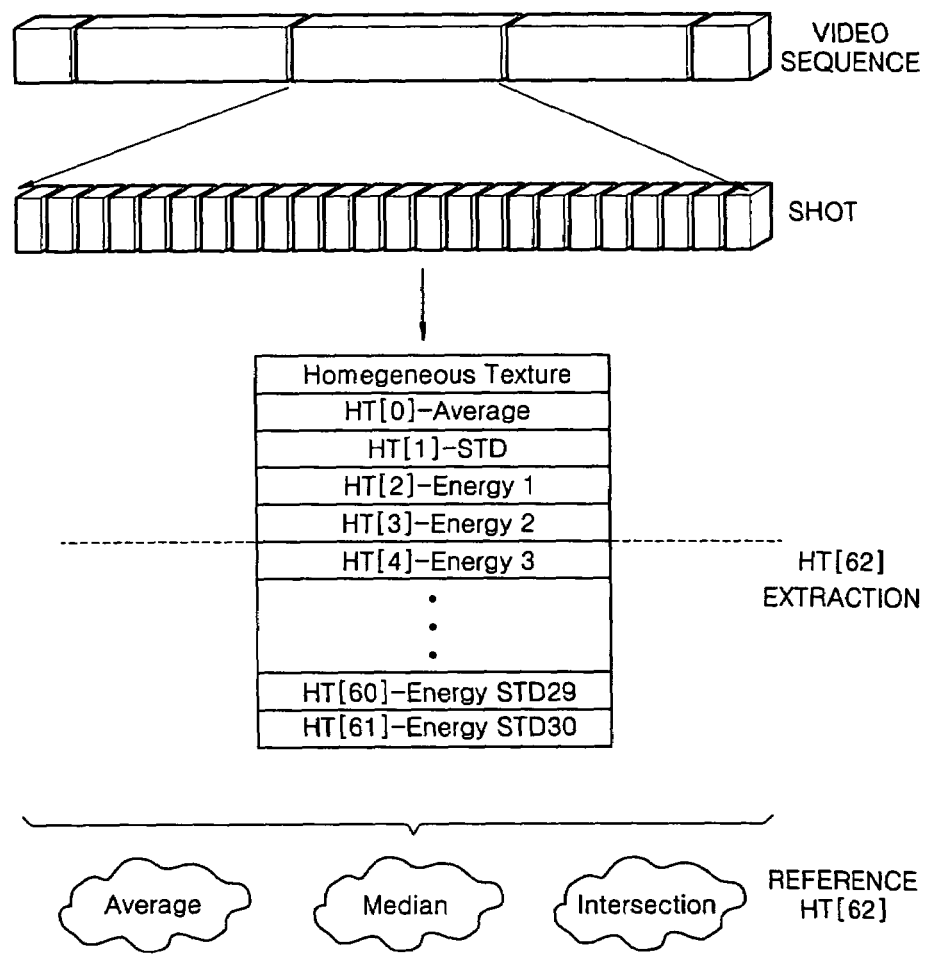
FIG. 2 is a view for explaining a process of expressing a GoF/GoP using a predetermined representative homogeneous texture descriptor (HTD) to reduce the amount of data.

FIG. 2 is a schematic view for explaining a process of expressing a GoF/GoP using one representative HTD to reduce the amount of data. According to the present invention, this process can be achieved using three methods.

In a first method, the representative HTD includes the average of the values of each of the components of the HTDs for all frames or pictures. This can be expressed as formula (2) below.

$$AvgHT_k(j) = 1/M \sum_{i=b_k}^{e_k} HT_i(j), \quad j = 0, \ldots, 61 \quad (2)$$

wherein $AvgHT_k(j)$ represents the average of the values of a $j^{th}$ component in a $k^{th}$ video shot, $HT_i(j)$ represents the average of the values of the $j^{th}$ component of homogeneous texture D in a $i^{th}$ frame, $b_k$ represents the first frame of the shot, $e_k$ represents the last frame of the shot; and M represents the number of frames in the shot.

In a second method, the representative HTD includes the median among the values of each of the components of the HTDs for all frames or pictures. This can be expressed as formula (3) below.

$$MedianHT_k(j) = median\{HT_{b_k+j}(.), HT_{e_k-j}(.), HT_{e_k}\},$$
$$j=0, \ldots, 61 \quad (3)$$

wherein $MedianHT_k(j)$ represents the median among the values of the $j^{th}$ component in a $k^{th}$ video shot, $HT_i(j)$ represents the $j^{th}$ component of homogeneous texture D in the $i^{th}$ frame, $b_k$ represents the first frame of the shot, and $e_k$ represents the last frame of the shot.

In a third method, the representative HTD includes the smallest among the values of each of the components of the HTDs for all frames or pictures. This can be expressed by formula (4) below.

$$IntHT_k(j) = min\{HT_i(j)\}, i \in [b_k, e_k], j=0, \ldots, 61 \quad (4)$$

wherein $IntHT_k(j)$ represents the value of a $j^{th}$ intersection in a $k^{th}$ video shot, $HT_i(j)$ represents the $j^{th}$ component of homogeneous texture D in the $i^{th}$ frame, $b_k$ represents the first frame of the shot, and $e_k$ represents the last frame of the shot.

The syntax of DDL that can be used in the homogeneous-descriptor based GoF/GoP texture description method according to the present invention is as follows.

```
<!-- ################################################## -->
<!-- D efinition of MPEG-7 GofGopFeature -->
<!-- ################################################## -->
<complexType name= GofGopFeature >
<complexContent>
    <element name= D escriptor x si:type= m peg7:VisualDType />
    <attribute name= a ggregation u se= o ptional >
        <simpleType>
            <restriction base= s tring >
                <enumeration value= A verage />
                <enumeration value= M edian />
                <enumeration value= S plitMerge />
            </restriction>
        </simpleType>
    </attribute>
</complexContent>
</complexType>
```

The syntax of binary expression that is used in the homogeneous-descriptor based GoF/GoP texture description method according to the present invention is in Table 2 below.

TABLE 2

| GofGopFeature{ | Number of bits | Mnemonic |
|---|---|---|
| AggregationFlag | 1 | bsbf |
| if( AggregationFlag){ | | |
| AggregationType | 3 | bsbf |
| } | | |
| DescriptorID | 8 | uimsbf |
| SizeOfDescriptor | 8 | uimsbf |
| Descriptor | | bsbf |
| } | | |

Semantics of the above descriptor will be descried briefly.

The DescriptorID field defines a descriptor identifier using a binary number. Examples of descriptors include Color Layout, Dominant Color, Edge Histogram, Homogeneous Texture, etc. For example, the ID of Color Layout can be 2, the Id of Dominant Color can be 7, the ID of Edge Histogram can be 8, the ID of Homogeneous Texture can be 12.

The sizeOfDescriptor field defines the size of a descriptor using a binary number.

The Descriptor field represents an elementary feature using a description tool defined in ISO/IEC 15938-3. Eight bits are assigned to this filed as in the SizeOfDescriptor field.

The AggregationFlag field represents the presence of an aggregation attribute. Average, Median, SplitMerge, etc., belong to the aggregation attribute.

Figure 3:
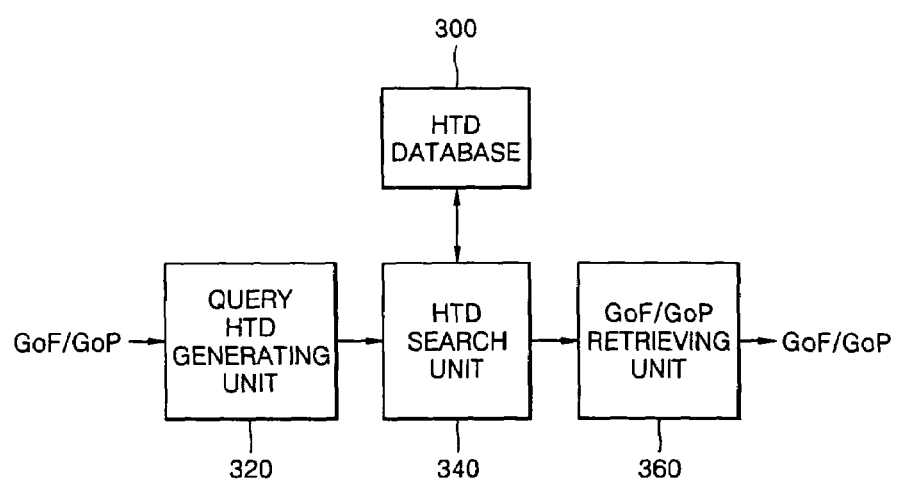
FIG. 3 is a block diagram of a GoF/GoP description apparatus using HTDs according to the present invention.

FIG. 3 is a block diagram of a GoF/GoP retrieval apparatus using the homogeneous descriptor according to the present invention. The GoF/GoP retrieval apparatus includes a HTD database 300, a query HTD generation unit 320, an HTD search unit 340, and a GoF/GoP retrieving unit 360.

The HTD database 300 stores HTDs of a plurality of GoFs's/GoPs's, wherein the HTD of each GoF/GoP is expressed using a predetermined representative HTD corresponding to one frame/picture to reduce the amount of data. The query HTD generating unit 320 generates a predetermined HTD of a query GoF/GoP when the query GoF/GoP is input.

The processes of expressing the GoF/GoP using the predetermined representative HTD in the HTD database 300 and the query HTD generating unit 320 are the same as described above in connection with the GoF/GoP texture description method according to the present invention.

The HTD search unit 340 searches HTDs that are similar to the HTD of the query GoF/GoP throughout the HTD database 300. The GoF/GoP retrieving unit 360 retrieves GoFs'/GoPs' corresponding to the searched similar HTDs and arranges the GoFs'/GoPs' in the order of degree of similarity.

Figure 4:
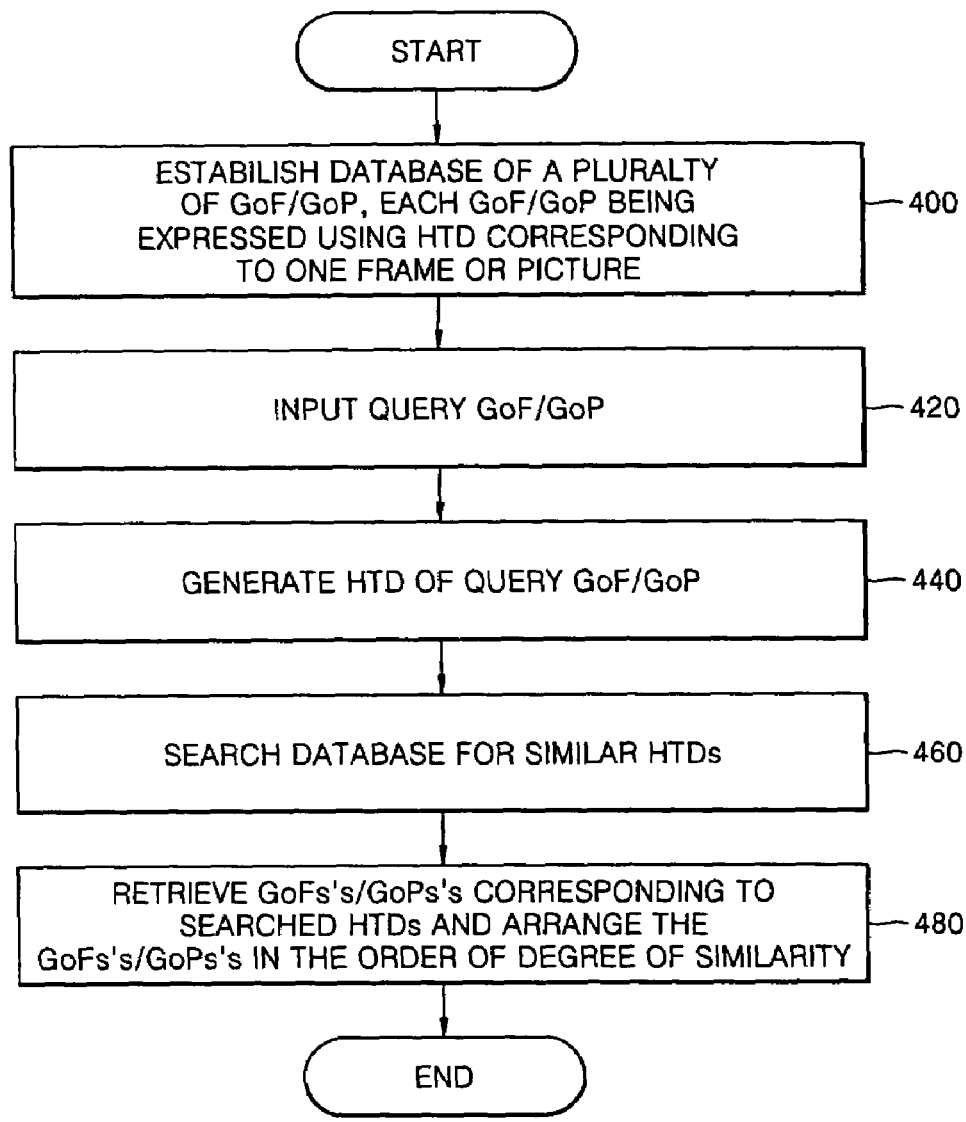
FIG. 4 is a flowchart illustrating a GoF/GoP retrieval method using HTDs according to the present invention.

FIG. 4 is a flowchart of a HTD-based GoF/GoP retrieval method according to the present invention. The operation of the GoF/GoP retrieval apparatus using HTDs according to the present invention will be described with reference to FIG. 3.

Initially, a database of HTDs for a plurality of GoFs'/GoPs' is established, wherein each GoF/GoP is expressed using one HTD (operation 400). When a query GoF or GoP is input (operation 420), the query HTD generating unit 320 generates a HTD corresponding to one frame or picture from HTDs of the query GoF/GoP (operation 440). The HTD search unit 340 searches HTDs that are similar to the HTD of the query GoF/GoP in the HTD database 300 (operation 460). Finally, the GoF/GoP retrieving unit 360 retrieves GoFs'/GoPs' corresponding to the similar HTDs and arranges the GoFs'/GoPs' in the order of degree of similarity (operation 480).

The HTD-based GoF/GoP retrieval method and apparatus according to the present invention were experimentally tested using a dataset. The results are as follows.

The dataset used includes some of dataset and queries defined in M5124(ISISO/IEC JTC1/SC29/WG11 M5124 "Core Experiment on Group-of-Frames/Pictures Histogram Descriptors(CT7)") and new dataset and queries. They are composed of 1822 shots with 33 queries as defined in M9811 (ISO/IEC JTC1/SC29/ WG11 M9811 "Dataset and Ground Truth set for VCE-3 (Definition and use of a new "TimeSequence data Container") ).

The video sequence used is as follows: misc1.mpg(CD20), misc2.mpg(CD21), camiloefilho.mpg(CD22), news2.mpg (CD18), basket.mpg(CD26), nhkvideo.mpg(CD26), Igerca_Lisa__1.mpg(CD31), and Igerca_Lisa__2.mpg(CD32).

In addition to the above dataset, a video sequence of culture.mpg(CD33), lascaux_english_sample.mpg (CD31), and tree1.mpg, which reflect the characteristic of texture distribution, was added.

The results of ANMRR using the HTD are shown in Table 3.

TABLE 3

| | Average | Median | Intersection |
|---|---|---|---|
| ANMRR | 0.128 | 0.118 | 0.242 |

As is apparent from Table 3, the first method using average and the second method using median show higher search performances.

The texture of images can be more accurately expressed and can be more efficiency and rapidly searched when using a GoF/GoP texture description method and a GoF/GoP retrieval method and apparatus according to the present invention.

The invention may be embodied as computer readable codes in a computer readable medium including all type of recording devices storing data readable by any information processing device such as a computer. Examples of the computer readable medium include ROM's, RAM's, CD-ROMs, magnetic tapes, floppy disks, optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of describing texture of a group of frames (GoF) or a group of pictures (GoP), the method comprising:
generating homogeneous texture descriptors of all frames constituting the GoF or all pictures constituting the GoP by a homogeneous texture generating unit; and
expressing the GoF or GoP using a predetermined representative homogeneous texture descriptor corresponding to one frame or picture,
wherein the predetermined representative homogeneous texture descriptor generated by the homogeneous texture generating unit in the expressing of the GoF or GoP includes at least one of an average value of values of each of components of the homogeneous texture descriptors for all the frames or pictures and a median value among the values of each of the components of the homogeneous texture descriptors for all the frames or pictures.

2. The method of claim 1, wherein components of each of the homogeneous texture descriptors include a mean and a variance of energies of frequency domains of a Garbor-filtered image, the energy of a DC channel, and the variance of all pixel values of the image.

3. The method of claim 2, wherein the homogeneous texture descriptors are expressed as:

$$F=[f_{STD}, f_{DC}, e(1), \ldots, e(30), d(1), \ldots, d(30)]$$

wherein $f_{STD}$ represents the variance of all pixel values of the image, $f_{DC}$ represents the energy of the DC channel, e(i), where i=1, CDOTS, 30, represents the mean of energies of each Garbor-filtered channel, and d(i), where i=1, CDOTS, 30, represents the variance of energies of each Garbor-filtered channel.

4. A method of retrieving a group of frames (GoF) or a group of pictures (GoP) that is similar to a query GoF or GoP, the method comprising:
establishing a database of homogeneous texture descriptors of a plurality of GoFs' or GoPs', each GoF or GoP being expressed by a predetermined representative homogeneous texture descriptor corresponding to one frame or picture by a homogeneous texture generating unit;
generating a homogeneous texture descriptor corresponding to one frame or picture of a query GoF or GoP when the query GoF or GoP is input;
searching homogeneous texture descriptors that are similar to the homogeneous texture descriptor of the query GoF or GoP in the database; and
retrieving GoFs' or GoPs' corresponding to the searched similar homogeneous texture descriptors and arranging GoFs' or GoPs' in the order of degree of similarity,
wherein the predetermined representative homogeneous texture descriptor generated by the homogeneous texture generating unit in the establishing the database includes one of an average value of values of each of components of the homogeneous texture descriptors for all the frames or pictures and a median value among the values of each of the components of the homogeneous texture descriptors for all the frames or pictures.

5. An apparatus for retrieving a group of frames (GoF) or a group of pictures (GoP) that is similar to a query GoF or GoP, the apparatus comprising:
a homogeneous texture descriptor database storing homogeneous texture descriptors of a plurality of GoFs' or GoPs', each GoF or GoP being expressed by a predetermined representative homogeneous texture descriptor corresponding to one frame or picture;
a query homogeneous texture descriptor generating unit generating a predetermined homogeneous texture descriptor of a query GoF or GoP when the query GoF or GoP is input;
a homogeneous texture descriptor search unit searching the database for homogeneous texture descriptors that are similar to the predetermined homogeneous texture descriptor of the query GoF or GoP; and
a GoF/GoF retrieving unit retrieving GoFs' or GoPs' corresponding to the searched similar homogeneous texture descriptors and arranging the GoFs' or GoPs' in the order of degree of similarity,
wherein the predetermined representative homogeneous texture descriptor generated by the homogeneous texture generating unit stored in the database includes at least one of an average value of values of each of components of the homogeneous texture descriptors for all the frames or pictures and a median value among the values of each of the components of the homogeneous texture descriptors for all the frames or pictures.

6. A computer readable medium having embodied thereon a computer program that causes a computer to execute the method of claim 1.

7. A computer readable medium having embodied thereon a computer program that causes a computer to execute the method of claim 2.

8. A computer readable medium having embodied thereon a computer program that causes a computer to execute the method of claim 3.

9. A computer readable medium having embodied thereon a computer program that causes a computer to execute the method of claim 4.

10. A method of representing the characteristics of a GoF/GoP (a group of frames or a group of pictures), the method comprising:
generating a descriptor regarding the GoF/GoP by a descriptor generating unit;
generating an aggregation flag regarding the GoF/GoP;
selecting an aggregation type according to the aggregation flag; and
representing the characteristics of the GoF/GoP based on the descriptor and the aggregation type,
wherein the aggregation type in the selecting of an aggregation type represents an aggregation attribute which includes at least one of an average value of values of each of components of the descriptors generated by the descriptor generating unit for all the frames or pictures and a median value among the values of each of the components of the descriptors for all the frames or pictures.

11. The method of claim 10, wherein the descriptor comprises at least one of a color layout descriptor, a dominant color descriptor, an edge histogram descriptor, and a homogeneous texture descriptor.

12. A computer readable medium having embodied thereon a computer program that causes a computer to execute the method of claim 10.

* * * * *